United States Patent [19]
Akai et al.

[11] Patent Number: 5,824,118
[45] Date of Patent: Oct. 20, 1998

[54] DYEING AUTOMOBILE SEAT COVERS CONTAINING ACRYLIC OR CATIONIC-DYEABLE POLYESTER

[75] Inventors: Minoru Akai; Itsuo Suda; Katsumi Nonomura; Kumiko Arai, all of Tokyo, Japan

[73] Assignee: Hodogaya Chemical Co., Ltd., Tokyo, Japan

[21] Appl. No.: 525,245

[22] Filed: Sep. 8, 1995

Related U.S. Application Data

[63] Continuation of Ser. No. 141,538, Oct. 27, 1993, abandoned.

[30] Foreign Application Priority Data

Oct. 27, 1992 [JP] Japan .................................... 4-310788
Mar. 19, 1993 [JP] Japan .................................... 5-083864

[51] Int. Cl.$^6$ .......................... C09B 29/00; C09B 45/00; B44C 1/28; B32B 9/04; B32B 27/36
[52] U.S. Cl. ..................... 8/662; 8/687; 8/692; 524/190; 525/375; 428/67; 428/411.1; 428/480; 534/608; 534/757
[58] Field of Search ..................... 534/608, 757; 8/920, 922; 524/190; 525/375; 428/67, 480, 411.1

[56] References Cited

U.S. PATENT DOCUMENTS

| | | | |
|---|---|---|---|
| 3,706,725 | 12/1972 | Ozutsumi, I et al. ................... | 534/608 |
| 3,822,247 | 7/1974 | Ozutsumi, III et al. ............ | 534/608 X |

FOREIGN PATENT DOCUMENTS

| | | | |
|---|---|---|---|
| 0233141 | 4/1964 | Austria ................................... | 534/608 |
| 2023625 | 11/1970 | Germany ............................... | 534/608 |
| 49-24224 | 3/1974 | Japan .................................... | 534/608 |
| 49-24225 | 3/1974 | Japan .................................... | 534/608 |
| 59-168064 | 9/1984 | Japan .................................... | 534/606 |

*Primary Examiner*—Floyd D. Higel
*Attorney, Agent, or Firm*—Foley & Lardner

[57] ABSTRACT

A dye which is durable for practical use in the field of coloring automobile seat materials for which a good light-fastness is required and a dyeing method making use of the dye is provided. In the method, a disazo dye is obtained by converting guanazole to a tetrazo compound and coupling the tetrazo with an indole derivative to form a compound which is then quaternized using e.g., an alkylating agent resulting in a red dye with superior light-fastness at high temperatures.

9 Claims, No Drawings

DYEING AUTOMOBILE SEAT COVERS CONTAINING ACRYLIC OR CATIONIC-DYEABLE POLYESTER

This application is a continuation of application Ser. No. 08/141,538, Oct. 27, 1993 now abandoned.

BACKGROUND OF THE INVENTION

1. Field of the Invention

This invention relates to a dye and a dyeing method that are useful for the manufacture of automobile seat materials for which a high light-fastness at high temperatures is required. More particularly, it relates to a dye capable of dyeing acrylic fibers and cationic-dyeable polyester fibers used as automobile seat materials or the like, and a dyeing method making use of the dye.

2. Related Background Art

Use of vinyl chloride synthetic leather as seat materials in the field of automobiles has in the past been prevalent as automobiles had been made popular. Such seat materials, however, do not absorb sweat from car-drivers or fellow passengers, and thus, may give them an unpleasant feeling. Accordingly, the seat materials have been replaced by those made of fibers having a higher-grade feeling. The fibers also have changed from rayons to nylon fibers, and nowadays have been further replaced by polyester fibers from the viewpoints of deterioration and/or light-fastness of fibers. The polyester fibers also have changed into products with a higher design performance. These products are obtained by blended weaving of regular polyeser fibers dyed with a dispersion dye and cationic-dyeable polyester fibers being dyed with a cationic dye. Under the existing conditions, attempts have been made to improve heat resistance of acrylic fibers so that their use can be expanded to automobile seat materials.

Light-fastness of textile goods is evaluated by exposing them to light at temperatures of 63°±3° C. as prescribed in JIS L-0842. In the case of automobiles, however, when they are parked under direct sunshine in summer with their doors are tightly shut, the surface temperatures of their seats reach nearly 100° C., in part because of the greenhouse effect in the insides of automobiles and the heat accumulation effect of urethane foams attached to the backs of seats. Hence, automobile manufacturers now demand dyed products with a good light-fastness at high temperatures.

To meet such a demand, dye manufacturers have coped with the matter by selecting dyes having actual results for tents or the like used under direct sunshine and also using ultraviolet absorbents in combination. A typical red cationic dye for acrylic fibers and cationic-dyeable polyester fibers used in the present industrial field is C.I. Basic Red 29.

In the field of automobile seat materials, the cationic-dyeable polyester fibers are mostly utilized as their blended woven fabric with regular polyester fibers.

However, it has been found that the dyed products of the cationic-dyeable polyester fibers dyed with use of cationic dyes said to have a good light-fastness at high temperatures have a little poorer light-fastness at high temperatures than the dyed products of the regular polyester fibers dyed with use of dispersion dyes having a good light-fastness at high temperature.

Among dyes corresponding to the three primary colors, red dyes in particular have a poor light-fastness at high temperatures, and hence it is strongly demanded to develop red dyes and to obtain dyed products having a good light-fastness at high temperatures.

In order to improve light-fastness at high temperatures, of automobile seat dyed products obtained from a blended woven fabric comprised of the regular polyester fibers and the cationic-dyeable polyester fibers, an improvement must be made in the light-fastness of cationic dyes used in the dyeing of the cationic-dyeable polyester fibers.

In particular, an improvement must be made in the light-fastness of red dyes having a poor light-fastness at high temperatures among the three primary color dyes. The present inventors have started to develop a red dye having a good light-fastness at high temperatures.

In the evaluation of light-fastness, however, the light-fastness is influenced by temperature conditions. Even dyes with a good light-fastness at 63°±3° C. which is a usual temperature condition according to JIS L-0842 will often suffer from an extreme lowering of light-fastness when exposed to light at high temperatures. Thus, the degree of its lowering can not be absolutely estimated from the results on the light fastness at 63°±3° C. that have been hitherto experienced.

SUMMARY OF THE INVENTION

The present inventors have made intensive studies on red dyes having a good light-fastness at high temperatures, and have accomplished the present invention.

The present invention provides a dye for an automobile seat material made of at least one of acrylic fibers and cationic-dyeable polyester fibers, comprising a red dye durable to exposure to light at about 89° C. for about 200 hours, represented by the Formula

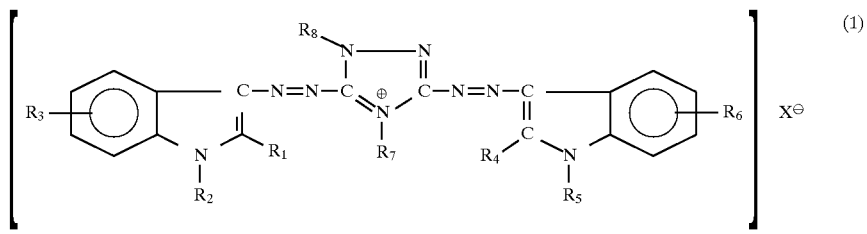

wherein $R_1$ represents a lower alkyl group or an aryl group, $R_2$ represents a lower alkyl group or a hydrogen atom, $R_3$ represents a hydrogen atom or a non-ionizing group, $R_4$ represents a lower alkyl group or an aryl group, $R_5$ represents a lower alkyl group or a hydrogen atom, $R_6$ represents a hydrogen atom or a non-ionizing group, $R_7$ and $R_8$ each represent a lower alkyl group that may be substituted with a hydroxyl group, carbamoylethyl group or benzyl group, and $X^\ominus$ represents an anion originating from an inorganic acid or organic acid.

The present invention also provide a method of dyeing at least one of the acrylic fibers and cationic-dyeable polyester fibers, comprising dyeing said fibers with use of the red dye represented by formula (1) described above.

DESCRIPTION OF THE PREFERRED EMBODIMENTS

The present invention is a dye for an automobile seat material made of at least one of acrylic fibers and cationic-dyeable polyester fibers, comprising a red dye durable to exposure to light at about 89° C. for about 200 hours, represented by the formula

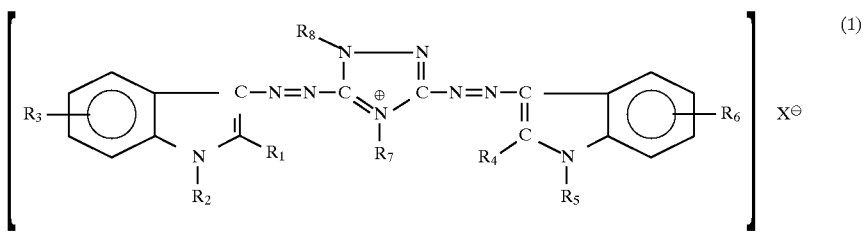

wherein $R_1$ represents a lower alkyl group or an aryl group, $R_2$ represents a lower alkyl group or a hydrogen atom, $R_3$ represents a hydrogen atom or a non-ionizing group, $R_4$ represents a lower alkyl group or an aryl group, $R_5$ represents a lower alkyl group or a hydrogen atom, $R_6$ represents a hydrogen atom or a non-ionizing group, $R_7$ and $R_8$ each represent a lower alkyl group that may be substituted with a hydroxyl group, carbamoylethyl group or benzyl group, and $X^\ominus$ represents an anion originating from an inorganic acid or organic acid. The present invention is also a dyeing method making use of this dye.

A lower alkyl used in the present invention may be straight or branched chain alkyl having 1 to 8 carbon atoms, for example, methyl, ethyl, n-propyl, isopropyl, n-butyl, sec-butyl, amyl, isoamyl, n-hexyl, 2-ethyl-n-hexyl, n-heptyl, n-octyl, isooctyl.

The dye used in the present invention can be obtained by converting guanazole into a tetrazo form, and coupling it with an indole derivative containing no acidic group dissociative into an acid in water, followed by quaternization using an alkylating agent.

The indole derivatives used as a starting material may include, for example, 2-methylindole, 1,2-dimethylindole, 1-methyl-2-phenylindole, 1-methyl-2-(4'-methylphenyl)indole, 1,2-dimethyl-5-chloroindole, 1,2,5-trimethylindole, 1-ethyl-2-phenylindole, 1-ethyl -2-phenyl-5-chloroindole, 1-ethyl-2-phenyl-5-methoxyindole, 2-phenylindole and 2-ethylindole.

The reaction to convert guanazole into a tetrazo form can be smoothly carried out by dropwise adding a 60% acetic acid solution of guanazole in nitrosylsulfuric acid at -5° C. to 0° C. The subsequent coupling reaction can be carried out by adding a glacial acetic acid solution of the azo component to a solution of the tetrazonium salt of guanazole, followed by neutralization of mineral acid using sodium acetate or ammonium acetate. Subsequently, the diazo dye thus produced may be poured into water, so that it can be readily isolated.

The resulting diazo dye is allowed to react with an alkylating agent or an aralkylating agent in an inert organic solvent as exemplified by benzene, toluene, xylene, chloroform, carbon tetrachloride, tetrachloroethane, chlorobenzene, o-dichlorobenzene, dioxane or dimethylformamide.

In this case, an excess amount of an alkylating agent or an aralkylating agent may be used in place of the inert organic solvent. As a preferred alkylating agent, an ester of an inorganic acid or organic sulfonic acid such as dimethyl sulfate, diethyl sulfate, benzenesulfonic acid methyl ester, p-toluenesulfonic acid methyl or ethyl ester may be used. As the aralkylating agent, benzyl chloride may be used, and acrylic amides and epoxides may also be used.

This reaction is an exothermic reaction. However, in many instances, the system must be heated before the reaction is initiated, and the reaction may preferably be carried out at an elevated temperature.

The dye salt thus quaternized deposits or precipitates so long as it is in the inert organic solvent, and hence can be readily separated by filtration. Alternatively, the solvent may be removed by distillation, e.g., vacuum distillation or steam distillation. In the case when solvents miscible with water are used, the dye salt in an aqueous solution may be separated by a process such as salting-out. The cationic diazo dyes obtained by the process of the present invention contain an anion corresponding to its molecule. This is usually derived from a strong inorganic acid or strong organic acid as exemplified by hydrobromic acid, sulfuric acid, benzenesulfonic acid, toluenesulfonic acid or monoalkyl sulfates, or derived from an anionic surface active agent selected from a condensate of naphthalenesulfonic acid with formaldehyde and a sulfonated product of lignin or a lignin derivative.

EXAMPLES

The present invention will be described below by giving Examples. The present invention is by no means limited to the following examples. In the following, "part(s)" and "%" refer to "part(s) by weight" and "% by weight", respectively, unless particularly noted.

The light-fastness shown in the Examples was measured and evaluated by the method shown below.

(1) JIS L-0842 method:

Samples were tested at 63°±3° C.

(2) High-temperature fade-o-meter (Suga Shikenki K. K.) method:

Samples lined with a urethane foam sheet of 10 mm thickness were tested at 83°±3° C. for 200 hours, and judged with a gray scale.

(3) Xenon exposure method i) Type II, manufactured by Wakomu Seisakusho. Samples were tested at 89° C. for 144 hours, and judged with a gray scale.

ii) A strong-energy xenon fade-o-meter SC-700 FTN, manufactured by Suga Shikenki K. K. Samples lined with a urethane foam sheet of 10 mm thickness were tested at 89° C. for 32 cycles, and judged with a gray scale. (1 cycle: exposure/non-exposure=3.8 hours/1 hour).

EXAMPLE 1

In 5,000 parts of hot water containing 2.5 parts of glacial acetic acid, 1 part of a dye represented by the formula:

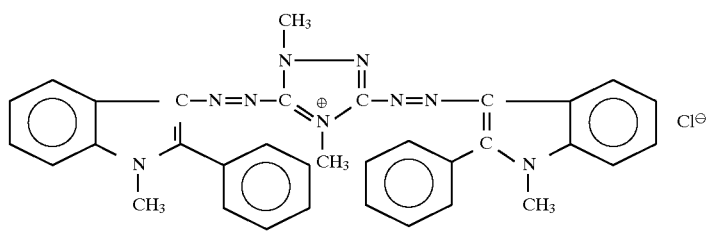

is dissolved to prepare a dye solution.

Dyeing method 1

To the above dye solution, 0.5 part of sodium acetate, 15 parts of anhydrous sodium sulfate and 2 parts of CIBATEX LF-N (trade name; an ultraviolet absorbent available from CIBA-GEIGY Limited) were added to prepare a dye bath.

In this dye bath, 100 parts of cationic-dyeable polyester fibers of a 120° C. dyeing type were immersed at 70° C., and their temperature was raised up to 120° C. at intervals of 1° C. per minute to carry out dyeing at 120° C. for 60 minutes. Thereafter, the dyed product was washed with water, and then dried.

Dyeing method 2

To the above dye solution, 0.5 part of sodium acetate and 2 parts of CIBATEX LF-N were added to prepare a dye bath.

In this dye bath, 100 parts of heat-resistant acrylic fibers was immersed at 70° C., and its temperature was raised up to 120° C. at intervals of 1° C. per minute to carry out dyeing at 120° C. for 60 minutes. Thereafter, the dyed product was washed with water, and then dried.

As Comparative Example, dyeing was similarly carried out using 1.7 part of C.I. Basic Red 29, and light-fastness was compared with each other. Results obtained are shown in Table 1.

TABLE 1

|  | Light-fastness | | |
| --- | --- | --- | --- |
| Dyeing method 1 | (1) | (2) | (3)-i) |
| Example 1: | 7th grade or higher | 4 | 4 |
| Comparative Example: | 7th grade or higher | 3–4 | 2 |
|  | Light-fastness | | |
| Dyeing method 2 | (1) | | (3)-ii) |
| Example 1: | 7–8 | | 2–3 |
| Comparative Example: | 8 | | 2 |

The dye used in Example 1 showed a better light-fastness at high temperatures than C.I. Basic Red 29.

EXAMPLES 2 to 19

Using dyes shown below, dyeing was similarly carried out according to the dyeing method 1 and the dyeing method 2, and the light-fastness was also evaluated. As a result, they showed a good light-fastness at high temperatures. Results obtained are shown in Table 2.

TABLE 2

| Example | Dye | Dyeing method 1 Light-fastness | | | Dyeing method 2 Light-fastness | |
| --- | --- | --- | --- | --- | --- | --- |
|  |  | (1) | (2) | (3)-i) | (1) | (3)-ii) |
| 2 | [structure] | >7 | 4 | 4 | 7–8 | 2–3 |
| 3 | [structure] | >7 | 4 | 4 | 7–8 | 2–3 |

TABLE 2-continued

| Example | Dye | Dyeing method 1 Light-fastness | | | Dyeing method 2 Light-fastness | |
|---|---|---|---|---|---|---|
| | | (1) | (2) | (3)-i) | (1) | (3)-ii) |
| 4 | [structure] | >7 | 4 | 4 | 7–8 | 2–3 |
| 5 | [structure] | >7 | 4 | 4 | 7–8 | 2–3 |
| 6 | [structure] | >7 | 4 | 4 | 7–8 | 2–3 |
| 7 | [structure] | >7 | 4 | 4 | 7–8 | 2–3 |
| 8 | [structure] | >7 | 4 | 4 | 7–8 | 2–3 |
| 9 | [structure] | >7 | 4 | 4 | 7–8 | 2–3 |

TABLE 2-continued

| Example | Dye | Dyeing method 1 Light-fastness (1) | (2) | (3)-i | Dyeing method 2 Light-fastness (1) | (3)-ii |
|---|---|---|---|---|---|---|
| 10 | (structure) | >7 | 4 | 4 | 7–8 | 2–3 |
| 11 | (structure) | >7 | 4 | 4 | 7–8 | 2–3 |
| 12 | (structure) | >7 | 4 | 4 | 7–8 | 2–3 |
| 13 | (structure) | >7 | 4 | 4 | 7–8 | 2–3 |
| 14 | (structure) | >7 | 4 | 4 | 7–8 | 2–3 |
| 15 | (structure) | >7 | 4 | 4 | 7–8 | 2–3 |

TABLE 2-continued

| Example | Dye | Dyeing method 1 Light-fastness (1) | (2) | (3)-i) | Dyeing method 2 Light-fastness (1) | (3)-ii) |
|---|---|---|---|---|---|---|
| 16 | (structure with two indole groups linked via N=N—C=N(+)(CH$_3$)—C=N—N, both indoles have NH and 2-CH$_3$; Cl$^\ominus$) | >7 | 4 | 4 | 7–8 | 2–3 |
| 17 | (structure: two indole groups with N-CH$_3$ and N-C$_2$H$_5$, 2-phenyl substituents, central N-CH$_3$; Cl$^\ominus$) | >7 | 4 | 4 | 7–8 | 2–3 |
| 18 | (structure: central N-C$_2$H$_4$OH, with HOH$_4$C$_2$ on top N; two indoles with N-CH$_3$ and 2-phenyl; Cl$^\ominus$) | >7 | 4 | 4 | 7–8 | 2–3 |
| 19 | (structure: central N-CH$_3$, top N-CH$_3$(H$_3$C), two indoles with N-C$_2$H$_5$ and 2-phenyl substituents) | >7 | 4 | 4 | 7–8 | 2–3 |

An anion of a condensate of naphthalenesulfonic acid with formaldehyde

As is seen from the foregoing Tables 2 and 3, the dyes of Examples 2 to 19 showed a good light-fastness at high temperatures like the dye of Example 1.

Although it was found that the dyed products of the cationic-dyeable polyester fibers dyed with use of cationic dyes have a poorer light-fastness at high temperatures than the dyed products of the regular polyester fibers dyed with use of dispersion dyes, the use of the dye of the present invention has solved the problem and has brought about an improvement in light-fastness at high temperatures.

What is claimed is:

1. A method of dyeing an automobile seat cover material made of an acrylic or cationic-dyeable polyester fiber comprising dyeing said fiber with the red dye represented by formula (1):

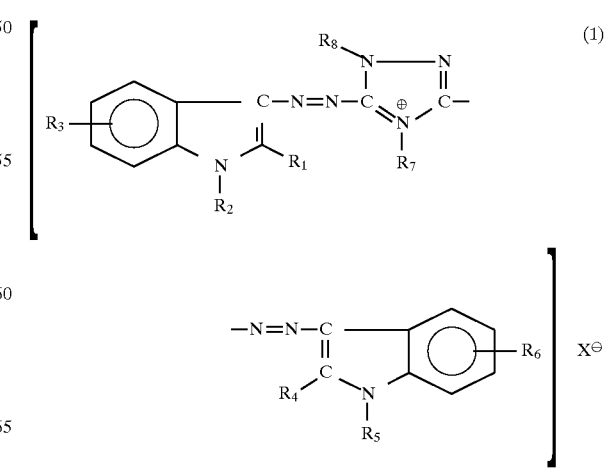

wherein $R_1$ represents aryl; $R_2$ represents lower alkyl; $R_3$ represents hydrogen; $R_4$ represents aryl; $R_5$ represents lower alkyl; $R_6$ represents hydrogen, $R_7$ and $R_8$ each represent lower alkyl; and X represents an anion of an inorganic or organic acid and incorporating the dyed fiber in the automobile seat cover material, and preparing an automobile seat cover from the dyed automobile seat cover material.

2. The method according to claim 1, wherein $R_1$ is methyl, ethyl, phenyl or tolyl, $R_2$ is hydrogen, methyl or ethyl, $R_3$ is hydrogen, halogen, methyl or methoxy, $R_4$ is methyl, ethyl, phenyl or tolyl, $R_5$ is hydrogen, methyl or ethyl, $R_5$ is hydrogen, methyl or ethyl, $R_6$ is hydrogen, halogen, methyl or methoxy, $R_7$ and $R_8$ are each independently methyl, ethyl, hydroxyethyl, carbamoylethyl or benzyl.

3. The method according to claim 1, wherein $R_1$ and $R_4$ are both phenyl, $R_2$ and $R_5$ are both methyl, $R_3$ and $R_6$ are both hydrogen, and $R_7$ and $R_8$ are both methyl.

4. The method according to claim 1, wherein $X^\ominus$ is a halogen ion or an anion of a condensate of naphthalenesulfonic acid with formaldehyde.

5. The method according to claim 2, wherein $X^\ominus$ is a halogen ion or an anion of a condensate of naphthalenesulfonic acid with formaldehyde.

6. The method according to claim 3, wherein $X^\ominus$ is a halogen ion or an anion of a condensate of naphthalenesulfonic acid with formaldehyde.

7. The method according to claim 4, wherein $X^\ominus$ is a halogen ion.

8. The method according to claim 5, wherein $X^\ominus$ is a halogen ion.

9. The method according to claim 6, wherein $X^\ominus$ is a halogen ion.

* * * * *